United States Patent [19]
Henson et al.

[11] Patent Number: 5,715,406
[45] Date of Patent: Feb. 3, 1998

[54] CONTROLLED BUS RESELECTION INTERFACE AND METHOD

[75] Inventors: Larry P. Henson, Santa Clara; Kumar Gajjar, San Jose; Thomas E. Idleman, Santa Clara, all of Calif.

[73] Assignee: EMC Corporation, Hopkinton, Mass.

[21] Appl. No.: 336,630

[22] Filed: Nov. 9, 1994

Related U.S. Application Data

[63] Continuation of Ser. No. 505,746, Apr. 6, 1990, Pat. No. 5,414,818.

[51] Int. Cl.$^6$ .................................................. G06F 13/42
[52] U.S. Cl. ........................ 395/287; 395/303; 395/726
[58] Field of Search ............................. 395/296, 303, 395/288, 287, 726

[56] References Cited

U.S. PATENT DOCUMENTS

| | | | |
|---|---|---|---|
| 4,463,445 | 7/1984 | Grimes | 395/325 |
| 4,488,218 | 12/1984 | Grimes | 395/325 |
| 4,791,563 | 12/1988 | Kling | 395/325 |
| 4,849,929 | 7/1989 | Timsit | 395/325 |
| 4,864,532 | 9/1989 | Reeve et al. | 395/325 |
| 4,870,643 | 9/1989 | Bultman et al. | 371/11.1 |
| 5,023,891 | 6/1991 | Johnson, III | 375/87 |
| 5,140,592 | 8/1992 | Idleman et al. | 371/8.1 |
| 5,146,574 | 9/1992 | Gajjar et al. | 395/425 |
| 5,166,939 | 11/1992 | Jaffe et al. | 371/40.1 |
| 5,175,537 | 12/1992 | Jaffe et al. | 340/825 |
| 5,185,876 | 2/1993 | Nguyen et al. | 395/425 |
| 5,195,100 | 3/1993 | Katz et al. | 371/66 |
| 5,202,856 | 4/1993 | Glider et al. | 365/230 |
| 5,204,951 | 4/1993 | Keener et al. | 395/325 |
| 5,212,785 | 5/1993 | Powers et al. | 395/575 |
| 5,214,778 | 5/1993 | Glider et al. | 395/575 |
| 5,226,010 | 7/1993 | Glider et al. | 365/189 |
| 5,233,618 | 8/1993 | Glider et al. | 371/68.1 |
| 5,274,645 | 12/1993 | Idleman et al. | 371/10 |
| 5,315,708 | 5/1994 | Eidler et al. | 395/250 |
| 5,325,497 | 6/1994 | Jaffe et al. | 395/425 |
| 5,349,686 | 9/1994 | Gajjar et al. | 395/800 |
| 5,359,320 | 10/1994 | Jaffe et al. | 340/825 |
| 5,361,063 | 11/1994 | Jaffe et al. | 340/825 |
| 5,361,347 | 11/1994 | Glider et al. | 395/575 |
| 5,386,548 | 1/1995 | Nguyen et al. | 395/425 |
| 5,388,228 | 2/1995 | Heath et al. | 395/325 |
| 5,388,243 | 2/1995 | Glider et al. | 395/425 |

FOREIGN PATENT DOCUMENTS

| | | | |
|---|---|---|---|
| 0 156 724 | 10/1985 | European Pat. Off. | G06F 3/06 |
| 0 201 330 | 11/1986 | European Pat. Off. | G11B 20/18 |
| 0 266 789 | 5/1988 | European Pat. Off. | G06F 3/06 |
| 0 320 107 | 6/1989 | European Pat. Off. | G06F 11/10 |

OTHER PUBLICATIONS

Muntz et al. (1990) "Performance Analysis of Disk Arrays Under Failure" UCLA Computer Science Department.

Seagate Product Catalog "Arrayed Disc Subsystem," Array Products Group, Boulder, CO ©1988.

*Primary Examiner*—Kevin A. Kriess
*Attorney, Agent, or Firm*—Townsend and Townsend and Crew LLP

[57] ABSTRACT

The present invention provides a method and apparatus for dynamically modifying the priority of access to a bus, where the bus has control and arbitration functions distributed among the devices coupled to the bus, with each device having a fixed priority level. Access to the bus by particular devices is selectively inhibited, preventing them from asserting their fixed priority level. In a preferred embodiment, the present invention provides control over the reselection of a SCSI bus by a plurality of SCSI devices coupled to the bus by providing a pseudo busy signal to SCSI devices from which reselection is not desired. In this fashion, an initiator may issue a plurality of commands to the SCSI devices and control the order in which the devices will be serviced when ready. A plurality of pseudo busy circuits are provided, with one coupled to each device on the bus. Each pseudo busy circuit is controlled by a control signal from the initiator. The pseudo busy circuit intercepts the busy line of the SCSI bus and provides a pseudo busy signal to the busy line input of the device when instructed by the initiator, although this requires additional control lines in conjunction with the SCSI bus, it allows the use of standard peripherals connectors and controllers designed for the SCSI bus.

23 Claims, 4 Drawing Sheets

| CS$_j$ | RS$_i$ | ENABLE | BSY |
|---|---|---|---|
| 0 | 0 | 1 | 0* |
| 0 | 1 | 1 | 0* |
| 1 | 0 | 1 | 0* |
| 1 | 1 | 0 | X+ |

\* NOT ON BUS - PSEUDO BSY ASSERTED
+ ON BUS - PSEUDO BSY ISOLATED

FIG._4.

CONTROLLED BUS RESELECTION INTERFACE AND METHOD

This is a Continuation of application Ser. No. 07/505,746 filed Apr. 6, 1990, now U.S. Pat. No. 5,414,818.

BACKGROUND OF THE INVENTION

The present invention relates generally to control of a prioritization protocol to dynamically change a priority of a device. More specifically, this invention relates to selective control of a plurality of devices organized in a logical matrix and operated under a small computer system interface ("SCSI") type protocol. SCSI is described in a publication of the American National Standard For Information Processing ("ANSI"), described in ANSI document No. X3.130-1986.

SCSI has been employed as a local I/O bus for providing a system computer, for example, with peripheral device independence for a class of devices. A variety of mass storage devices (such as disk drives, tape drives, optical drives, and memory caches), printers, microprocessors, protocol translators (such as a modem) and other devices can be added to a computer system without modification to system hardware or software. In addition, special features and functions of individual devices can be handled through use of device-independent fields and codes.

SCSI provides for a plurality of devices to share a local bus, wherein at least one of the devices is denominated an "initiator" which supervises activity on the bus. Each device obtains bus control upon successful arbitration. A SCSI type local bus is one in which the SCSI prioritization protocol is manifested when the determination of access to the local bus during arbitration is based upon a fixed ID of an arbitrating device.

SUMMARY OF THE INVENTION

The present invention provides a method and apparatus for dynamically modifying the priority of access to a bus, where the bus has control and arbitration functions distributed among the devices coupled to the bus, with each device having a fixed priority level. Access to the bus by particular devices is selectively inhibited, preventing them from asserting their fixed priority level.

In a preferred embodiment, the present invention provides control over the reselection of a SCSI bus by a plurality of SCSI devices coupled to the bus by providing a pseudo busy signal to SCSI devices from which reselection is not desired. In this fashion, an initiator may issue a plurality of commands to the SCSI devices and control the order in which the devices will be serviced when ready.

A plurality of pseudo busy circuits are provided, with one coupled to each device on the bus. Each pseudo busy circuit is controlled by a control signal from a reselection control circuit. The pseudo busy circuit intercepts the busy line of the SCSI bus and provides a pseudo busy signal to the busy line input of the device when instructed by the reselection control circuit, although this requires additional control lines in conjunction with the SCSI bus, it allows the use of standard peripherals, connectors and controllers designed for the SCSI bus.

In one embodiment, the method and apparatus of the present invention is effectively used to control access to a matrix of SCSI devices arranged in multiple rows and columns. A separate initiator is used for each column and communicates with the SCSI devices on that column by use of a SCSI bus, wherein an assertion of a BSY signal to a target inhibits that target from attempting to reselect an initiator when it is ready in response to a previously issued command.

A reselection control circuit is used for selectively asserting pseudo busy control signals in the form of row select signals and column select signals. This provides flexibility in allowing selection of either a row, a column, or a subset of a row (by selecting the row and multiple columns in that row). Coupled to each disk drive is a pseudo busy circuit responsive to its respective row select signal and column select signal for providing a pseudo busy signal to its disk drive.

The invention efficiently and economically provides an apparatus to ensure that undesired disk drives, which otherwise are independently operable to reselect a data bus line, are temporarily inhibited by a pseudo busy signal to prevent an attempt to reselect an initiator on the data bus. Only desired disk drives of a particular row subset will attempt to access their respective SCSI bus, permitting access to the initiator as soon as the drive is ready. Thus, a maximization of data flow is provided and an improved network bandwidth is obtained.

The SCSI prioritization protocol inherently promotes an imbalance between access times among the various targets on a single SCSI bus. This imbalance results from high priority devices winning arbitrations over lower priority devices. By selective control over each device's reselection of a particular SCSI bus, this access time imbalance may be reduced or altered in any particular fashion. In certain implementations, it may be desirable to promote an imbalance in access times. These implementations may include those times when a particular device has a forecasted work queue which is larger than other devices on a particular SCSI bus. The device with the larger queue may be given a greater priority access to the initiator to permit it to process the larger amount of work thereby skewing the access time imbalance. A microprocessor may be responsible for establishing and monitoring a work queue for the various devices.

A further understanding of the nature and advantages of the invention may be realized by reference to the remaining portions of the specifications and the drawings.

DESCRIPTION OF THE PREFERRED EMBODIMENT

General Description of Relevant Portions of SCSI Interface

Figure 1:
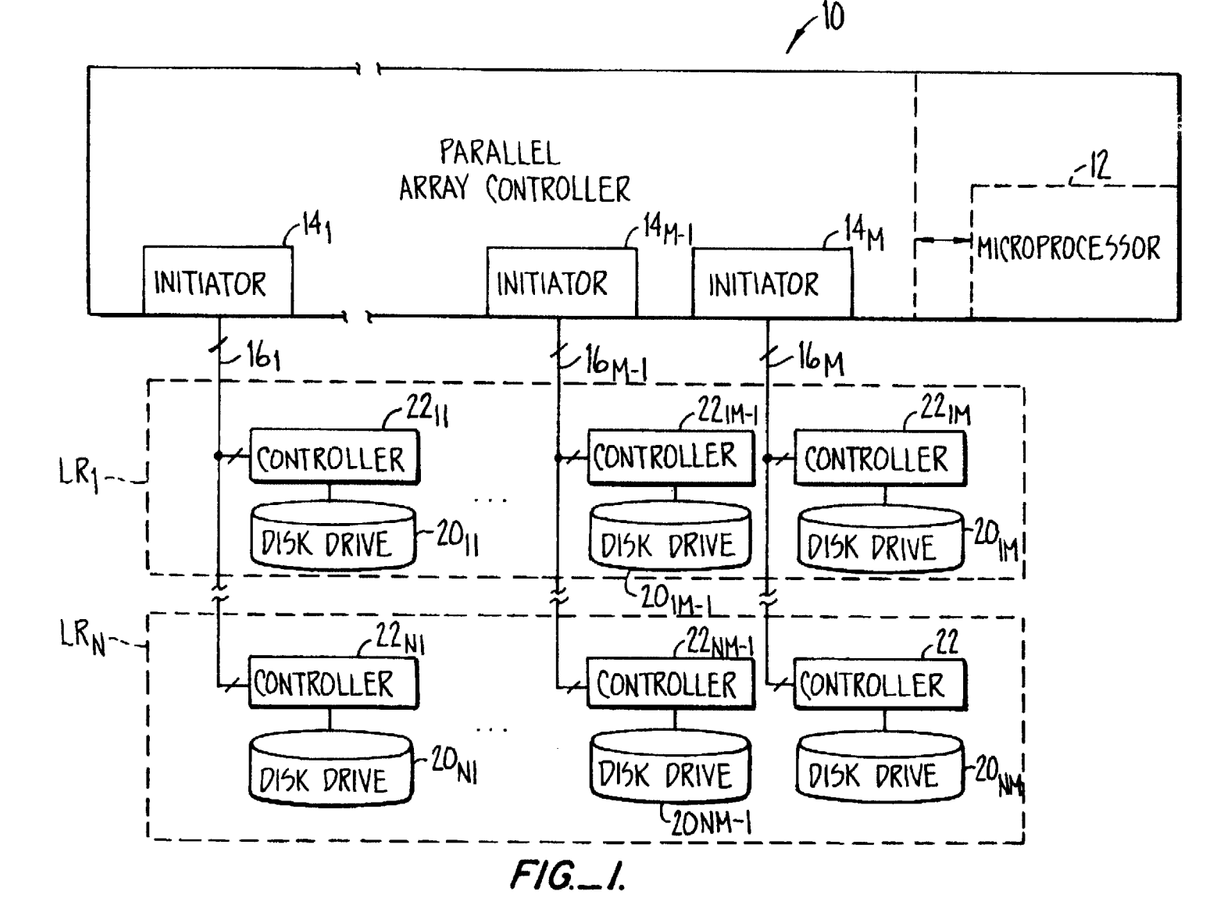
FIG. 1 is a schematic block diagram of a parallel array controller 10 using a plurality of disk drive units $20_{ij}$ arranged in a matrix.

FIG. 1 is a block schematic diagram illustrating an implementation of a parallel array controller ("PAC") 10 to control a matrix configuration of mass storage devices. PAC 10 includes a microprocessor 12 and a plurality of initiators $14_j$ for control over a particular column j, each initiator $14_j$ implementing a common SCSI prioritization protocol to be described below. Each initiator $14_j$ is coupled via a SCSI bus $16_j$ to a plurality of SCSI type storage devices, for example, disk drives $20_{ij}$ logically arranged in rows i and columns j. Initiator $14_j$ controls an exchange of data with its respective disk drives $20_{ij}$ by use of a controller $22_{ij}$, in response to control signals from the microprocessor 12.

Implementation of communication between an initiator $14_j$ and a target, for example disk drive $20_{ij}$, through use of SCSI protocol is controlled by various signals permitting either an initiator $14_j$ or disk drive $20_{ij}$ to control SCSI bus $16_j$ to enter one of a plurality of predetermined phases.

The SCSI architecture includes eight distinct predetermined phases. Each SCSI bus $16_j$ can never be in more than one phase at any given time. These eight phases include:

| | |
|---|---|
| 1. Bus free phase | 5. Command phase |
| 2. Arbitration phase | 6. Data phase* |
| 3. Selection phase | 7. Status phase* |
| 4. Reselection phase | 8. Message phase* |

*These phases are collectively termed the information transfer phases.

The physical SCSI bus uses a 50 pin connector. There are 8 lines dedicated to data, one line for the busy signal, one line for the select (or reselect) signal, and other control, power and ground lines.

The bus free phase indicates that no SCSI device is actively using a particular SCSI bus $16_j$ and that SCSI bus $16_j$ is available for subsequent users.

The arbitration phase enables a particular SCSI device to gain control of the bus $16_j$ so that it can assume the role of an initiator $14_j$ or a target, here disk drive $20_{ij}$. The procedure by which a SCSI device gains control of a particular SCSI bus $16_j$ is as follows:

1. The particular SCSI device must first wait for the bus free phase to occur.
2. The device must wait a minimum of a predetermined bus free delay after detection of the bus free phase before driving any signal.
3. Following the bus free delay in step 2 above, the device may arbitrate for the SCSI Bus $16_j$ by asserting the BSY signal and its own SCSI identification data bit ("SCSI ID").
4. After waiting at least a predetermined arbitration delay (measured from its assertion of the BSY signal) the device must examine SCSI bus $16_j$. If a higher priority SCSI ID bit is asserted on the data bus (DB 7 is the highest), then the device has lost the arbitration and the device must release its signals and may return to step 1.

(Note: In particular implementations, the initiator is established to have the highest priority.) If no higher priority SCSI ID bit is true on the data bus, then the device has won the arbitration and it must assert the SEL signal. Any other device that is participating in the arbitration phase has lost the arbitration and must release its BSY signal and its SCSI ID bit.

The SCSI ID bit is a single bit on the data bus that corresponds to the device's unique SCSI address. All other data bus bits must be released by the device. Therefore, with eight data bits, eight devices may be present on a single SCSI bus $16_j$. In this case, one initiator $14_j$ and up to seven disk drives $20_{ij}$ may be present.

When an initiator $14_j$ is ready to read data from a target, it takes control of SCSI data bus $16_j$ and issues a command to a particular target. The command may be issued to access a particular block of data from a drive, for example. The drive, if the data is not immediately ready, will issue a disconnect command. The disconnect command permits the initiator $14_j$ to issue another command to, or accept data from, another target.

When the particular target is ready, it will wait until it detects a bus free phase. Upon detection of the bus free phase, the particular target will attempt to reselect the initiator $14_j$ which issued the command. The reselection phase is entered after an arbitration has been performed to determine which device, among other possible targets which may have data ready in response to other commands previously issued by the initiator $14_j$, has priority to reselect the initiator $14_j$.

Reselection is subject to a selection/reselection timeout delay of a minimum of 250 milliseconds. This reselection delay is the minimum time that a target will wait for a BSY signal response during reselection before starting a timeout procedure.

A ready device winning the arbitration will attempt to reselect the initiator $14_j$ to satisfy its command. The winning device asserts both BSY and SEL signals and becomes a target by asserting an I/O signal and setting SCSI bus $16_j$ to a value that is the logical sum of its SCSI ID bit and the initiator's SCSI ID bit. An initiator $14_j$ determines that it is being reselected when the SEL and I/O signals and its SCSI ID bit are asserted and the BSY signal is not asserted.

However, the winning device may not be the device with which the initiator $14_j$ would like to exchange data. In this case, the initiator $14_j$ will not respond and the timeout procedure will commence, followed by a bus free phase. During this subsequent bus free phase, ready targets may again arbitrate in an attempt to reselect the initiator.

An inefficient situation exists in the configuration illustrated in FIG. 1 during reselection because each disk drive $22_{ij}$ coupled to a particular initiator $14_j$ will attempt to independently reselect during a bus free phase. If multiple disk drives $22_{ij}$ are attempting to reselect a particular initiator $14_j$, as when multiple operations have been separately initiated, then when an arbitration is recommenced for reselection after a bus free phase, these disks drives $20_{ij}$ will arbitrate for control of SCSI bus $16_j$. The highest priority disk drive $22_{ij}$ arbitrating will win and reselect the initiator $14_j$, irrespective of which disk drive $20_{ij}$ was desired by the initiator $14_j$.

In certain implementations, it is desirable to logically arrange selected ones of disk drives $20_{ij}$ to be connected to one or more of the initiators $14_j$. As illustrated, disk drives $20_{11}$ through $20_{1M}$ are included in logical row 1 ("$LR_1$"). Similarly, $LR_N$ also includes a disk drive $20_{Nj}$ connected to each initiator $14_1$ through $14_M$.

In implementing certain data manipulations, it is necessary to simultaneously access an entire logical row $LR_i$, or a particular subset of a particular logical row $LR_i$. As described above, the SCSI protocol does not permit direct addressing of disk drives $20_{ij}$ during reselection. If data on disk drives $20_{1j}$ of logical $LR_i$ are desired, each initiator $14_j$ would have to wait until the desired disk drive $20_{1j}$ happened to gain access to its particular SCSI bus $16_j$ before proceeding. Each device attempts to reselect its respective initiator $14_j$ independently. A disk drive $20_{i1}$ from any of logic rows $LR_2$ through $LR_N$ may be connected to an initiator $14_1$ while the other initiators $14_2$ through $14_M$ are coupled to disk drives $20_{1j}$ of $LR_1$. In this situation, when an inappropriate disk drive $20_{i1}$ has control of data bus $16_1$, disk drive $20_{i1}$ will timeout and disconnect as initiator $14_1$ will not respond.

When a subsequent bus free phase is detected, disk drive $20_{11}$ of $LR_1$ may gain access to the SCSI bus $16_1$ and communicate with initiator $14_1$. Since access is controlled by priority during reselection, it may never occur that disk drive $20_{11}$ reselects initiator $14_1$ until higher priority disk drives that are ready have been serviced.

It is therefore an object of the present invention to permit the PAC 10 to quickly and efficiently select disk drives $20_{ij}$ which correspond to a particular group or subgroup of a desired logic row LR.

A Preferred Embodiment With An Array of Disk Drives

Figure 2:
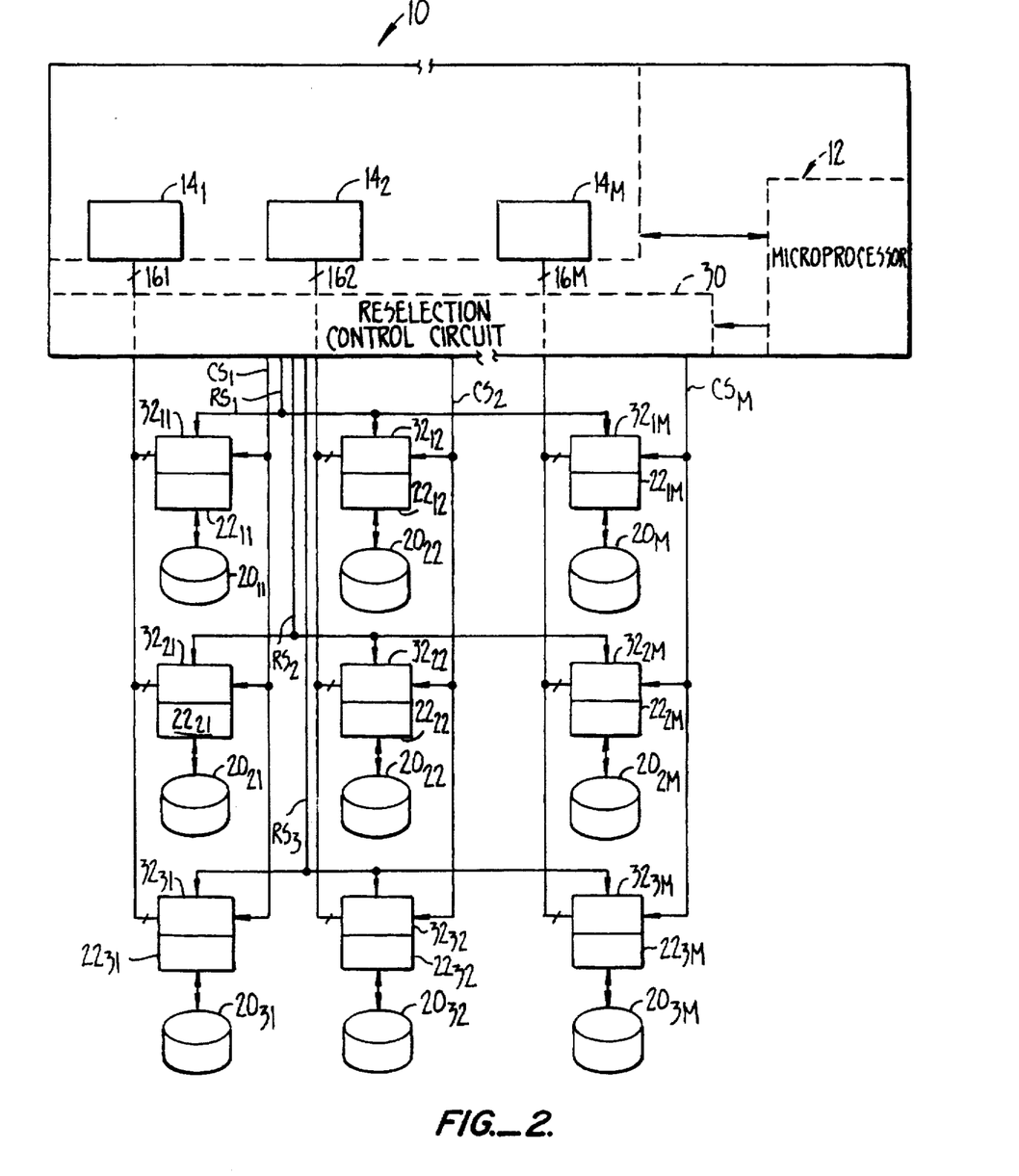
FIG. 2 is a schematic block diagram illustrating a preferred embodiment of the present invention.

FIG. 2 is a schematic block diagram of a preferred embodiment of the present invention. PAC 10 includes the microprocessor 12 and a plurality of initiators $14_j$ coupled to a column of disk drives $20_{ij}$. Disk drives $20_{ij}$ are arranged in a matrix having a plurality of logical rows with each disk drive $20_{ij}$ controlled by a controller $22_{ij}$.

A reselection control circuit 30 is provided as part of PAC 10 and is responsive to control signals from microprocessor 12 to enable a set of disk drives $20_{Kj}$ of a particular logical row $LR_K$. In response to control signals from the microprocessor 12, reselection control circuit 30 generates a plurality of row select signals and column select signals. A column select ("$CS_j$") signal and a row select ("$RS_i$") signal are each coupled to a logic circuit $32_{ij}$ for asserting a pseudo busy signal. Logic circuit $32_{ij}$ is coupled in turn to each controller $22_{ij}$ and is responsive to the $RS_i$ and $CS_j$ signals.

In operation, for an access of disk drives $20_{11}$ and $20_{12}$ of first logic row $LR_1$, reselection control circuit 30 will assert $RS_1$, $CS_1$ and $CS_2$. Logic circuit $32_{11}$ and logic circuit $32_{12}$ will respond to $RS_1$, $CS_1$ and $CS_2$ to permit conventional operation of disk drives $20_{11}$ and $20_{12}$. Other logic circuits $32_{ij}$ will assert a pseudo busy signal to controllers $22_{ij}$ of disk drives $20_{ij}$ which will inhibit them from reselecting initiators $14_j$ of their respective SCSI bus $16_j$. Only when each disk drive $20_{11}$ and $20_{12}$ is ready will the BSY signal be asserted to respective initiators $14_1$ and $14_2$. During reselection, when disk drive $20_{11}$, for example, is ready to reselect its initiator, $14_1$, it detects a bus free phase and asserts the BSY signal for arbitration during reselection. As other disk drives $20_{ij}$ are provided a pseudo BSY signal they will not attempt to reselect the SCSI bus $16_j$.

Figures 3A, 3B:
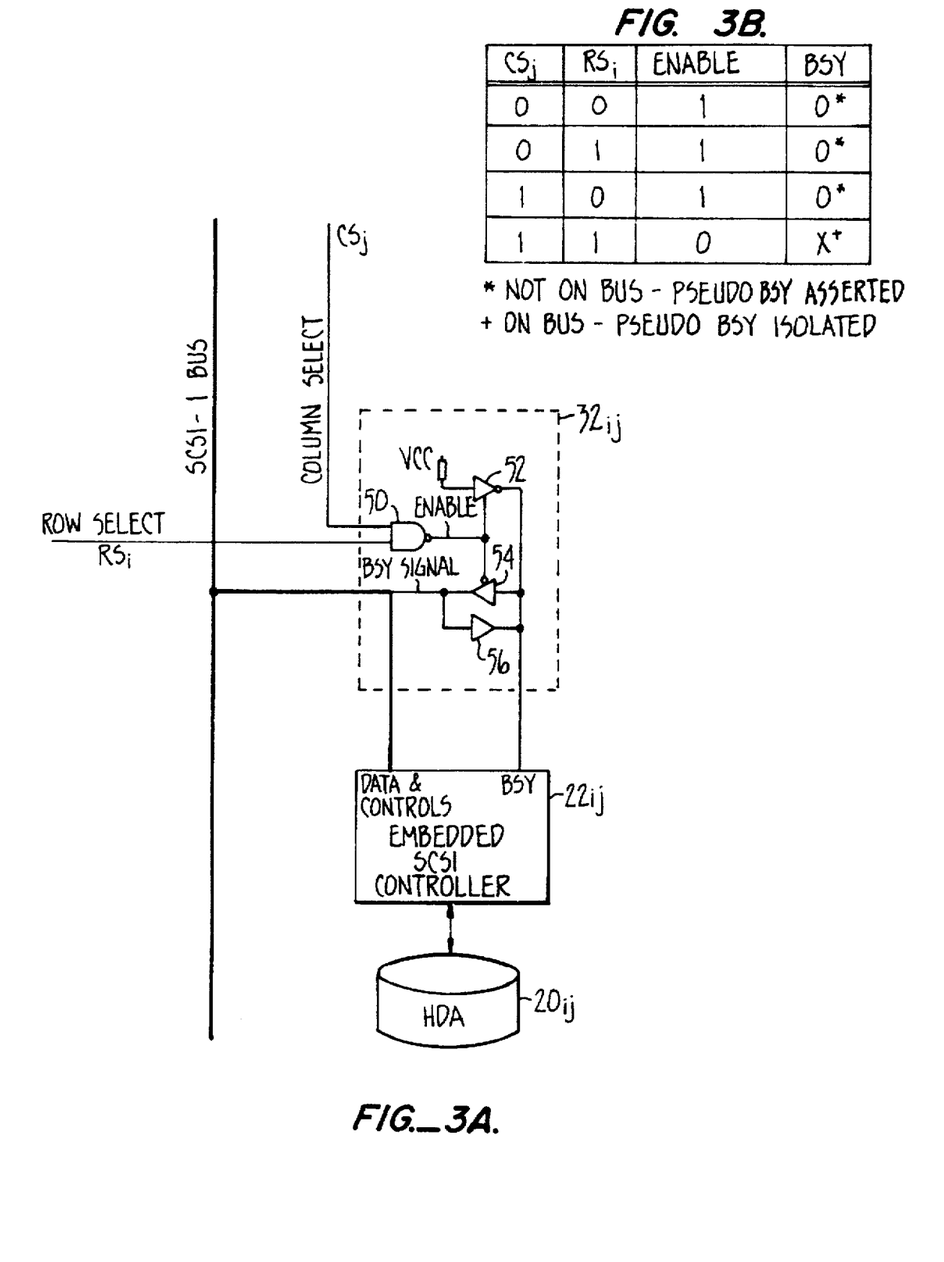
FIG. 3A is a schematic diagram of an implementation for asserting a pseudo busy signal to disk drive units not in a particular desired logical row.
FIG. 3B is a logic diagram showing the use of column select and row select signals in the implementation shown in FIG. 3A.

FIG. 3A is a schematic diagram of a logic circuit $32_{ij}$ of a preferred embodiment of the present invention. Logic circuit $32_{ij}$ includes a logic gate 50 for producing a complement of a logical AND of row select signal $RS_i$ and column select signal $CS_j$. An output of logic gate 50, an enable signal, is coupled to an enabling input of an inverting tristate driver 52 and to an inverted enabling input of a non-inverting tristate driver 54. A supply voltage $V_{cc}$ is provided as an input to inverting tristate driver 52 having an output coupled to a BSY signal input terminal of controller $22_{ij}$. An input of non-inverting tristate driver 54 is coupled to the output of inverting tristate driver 52. Non-inverting tristate driver 54 has an output coupled to a BSY signal channel of SCSI bus $16_j$. A driver 56 has an input coupled to the output of non-inverting tristate driver 54 and an output coupled to the input of noninverting tristate driver 54.

Referring to FIG. 3B, which is a logic diagram showing the use of $RS_i$ and $CS_j$ in logic circuit $32ij$, in operation, without signals asserted on $RS_i$ and $CS_j$, logic gate 50 normally asserts the enable signal. Assertion of the enable signal indicates that the particular drive $20_{ij}$ to which it is coupled is not part of a desired logical row LR, and a pseudo BSY signal should be coupled to controller $22_{ij}$ at its BSY terminal input. The enable signal provided to inverting tristate driver 52 and non-inverting tristate driver 54 enables inverting tristate driver 52 to assert BSY to the BSY terminal of controller $22_{ij}$. Similarly, tristate driver 54 is disabled by the enable signal from logic gate 50 and prevents the pseudo BSY signal from manifesting itself on SCSI bus $16_j$. Driver 56 permits a bona fide BSY signal from SCSI bus $16_j$ to be coupled directly to the BSY input line of controller $22_{ij}$ in the event that SCSI bus $16_j$ is, in fact, busy. The pseudo busy signal remains until both $RS_i$ and $CS_j$ are asserted to logic gate 50 which negates the enable signal. Negation of the enable signal disables inverting tristate driver 52 and enables non-inverting tristate driver 54 for normal operation of controller $22_{ij}$ with respect to initiator $14_j$ on SCSI bus $16_j$.

Figure 4:
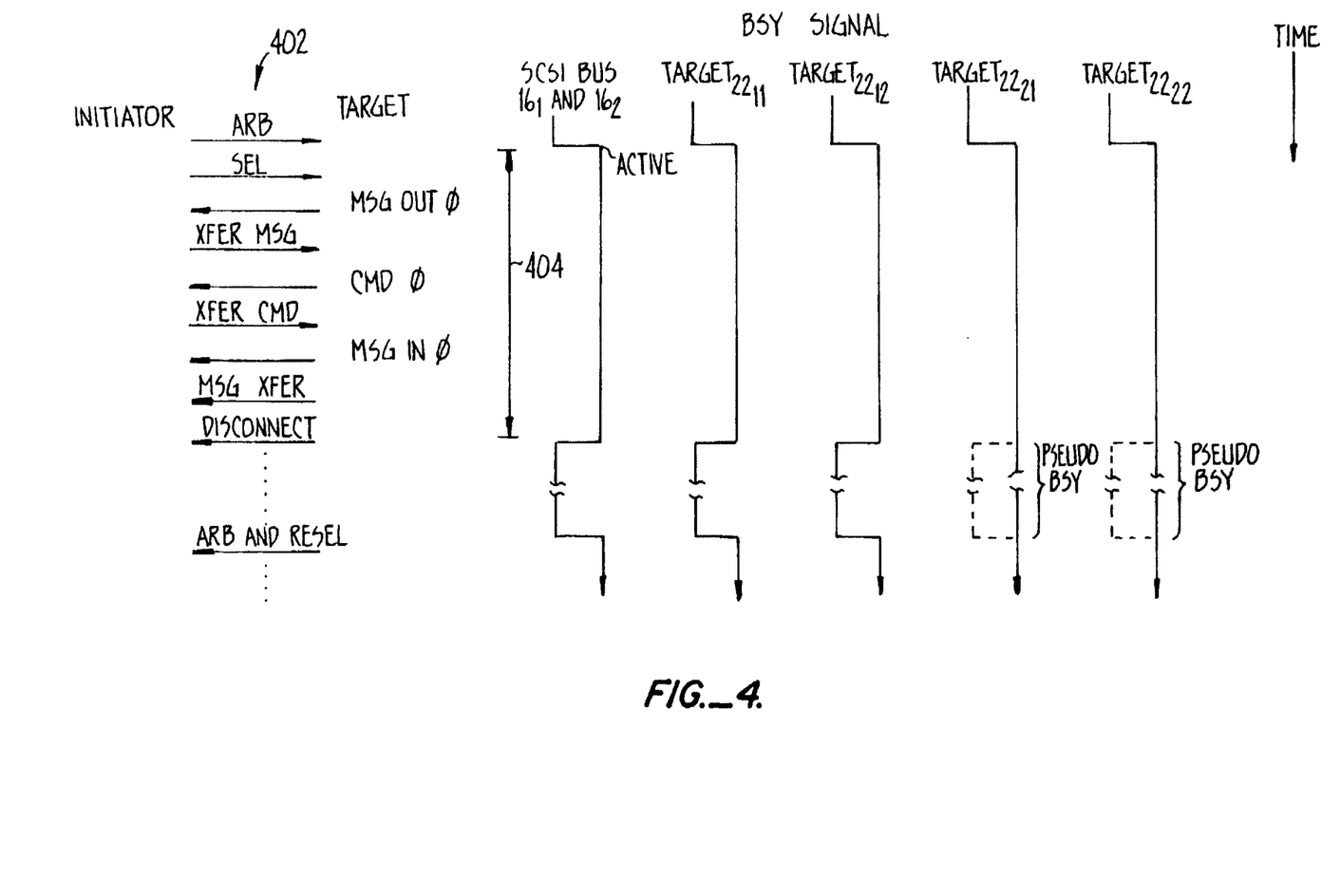
FIG. 4 is a timing chart illustrating operation of a 2×2 matrix of SCSI type devices implementing an embodiment of the present invention as illustrated in FIG. 2.

FIG. 4 is a timing chart illustrating operation of a 2×2 matrix of SCSI type devices. For simplification, the first column of two SCSI type devices will be assumed to be coupled to a first SCSI type bus $16_1$ and the second column of two SCSI type devices are coupled to a second bus $16_2$ which have identical timing characteristics. Communication between an initiator and a target is outlined by illustration of a progression of phases of a SCSI type prioritization protocol in column 402, with the vertical axis representing time, starting at the top. First, the initiator waits for a bus free phase when the SCSI bus has BSY inactive to arbitrate. The initiator wins the arbitration ("ARB") because it has the highest priority and asserts a selection ("SEL") to targets on the bus. The targets and the initiator exchange messages ("MSG") and commands ("CMDs") during a period of time indicated by arrow 404. A constant busy assertion is shown for each target during this time for simplicity, although multiple assertions of the busy line will occur. When the desired commands have been exchanged, the targets disconnect at the end of period 404, and the targets perform the task requested (i.e., a disk drive retrieves data). When a target is ready to transmit, it checks its busy channel for BSY, and if a bus free phase is detected reselection as described above is attempted. However, for $target_{22_{21}}$ and $target_{22_{22}}$ a BSY signal will be detected inhibiting their attempts to arbitrate and reselect their respective initiators. The five BSY SIGNAL time lines of FIG. 4 illustrate that $target_{22_{21}}$ and $target_{22_{22}}$ will have a pseudo BSY signal asserted even though each SCSI bus $16_1$ and SCSI bus $16_2$ go inactive after a disconnect command. These pseudo busy signals permit $target_{22_{11}}$ and $target_{22_{12}}$ to detect a bus free phase and reselect their respective initiator without arbitrating against $target_{22_{21}}$ and $target_{22_{22}}$, respectively. This permits the initiator to have access to a particular desired target, irrespective of a prioritization protocol which would grant reselection control to a highest priority device arbitrating.

The disclosed preferred embodiment provides apparatus to select a subset of a particular logical row by use of column select signals. It may be desirable that an entire logical row be chosen and that subsets not be chosen. In this instance, logic gate 50 (FIG. 3A) may be removed and, as there is no longer a need for column select signal $CS_j$, the $RS_i$ signal may be used to enable or disable the tristate drivers 52 and 54. The present invention may also be used to permit a single initiator to determine which of a plurality of SCSI storage devices it controls, by allowing it to reselect the SCSI bus during a bus free phase. The present invention is not limited to selection of storage devices all within the same logical row. It is possible, by use of the present invention to arbitrarily select any row from each column, or to enable multiple storage devices in each column.

The invention has been described by reference to specific embodiments. Other embodiments will be apparent to those of ordinary skill in the art without departing from the spirit of the present invention. For example, a network bus could be used instead of a SCSI bus. The devices on the bus look for the absence of the carrier sense signal before trying to access the bus. Thus, a pseudo carrier sense signal could be generated with appropriate logic to control access to the bus. It is therefore not intended that the invention be limited except as indicated by the appended claims.

What is claimed is:

1. An apparatus for modifying a prioritization protocol used to determine which one of a plurality of devices, each having an assigned priority level, is granted access to a bus, said prioritization protocol promoting an imbalance in bus access time between individual devices of said plurality of devices, said apparatus comprising:

priority modification means, coupled to said plurality of devices, for modifying said prioritization protocol of selected devices of said plurality of devices by preventing said selected devices from accessing said bus by asserting a pseudo busy signal to each of said selected devices;

control means, coupled to said priority modification means, for controlling said priority modification means to reduce said imbalance; and a selection circuit, coupled to said plurality of devices, for selecting, from said plurality of devices, said selected devices to be prevented from accessing said bus in accordance with a desired priority of bus access.

2. The apparatus of claim 1 wherein said selected devices are properly functioning devices.

3. The apparatus of claim 2 wherein said imbalance is promoted on each said bus and said controlling means reduces said imbalance for each said bus.

4. The apparatus of claim 1 further comprising:

forecasting means, coupled to said control means, for forecasting an imbalance in access times for said devices intercoupled on the bus and causing said control means to reduce said forecasted imbalance.

5. The apparatus of claim 4 wherein said control means is operable to nonselect a particular device requiring a first access time more frequently than a particular device requiring a second access time which is less than said first access time.

6. The apparatus of claim 1 wherein said prioritization protocol is a SCSI-type protocol.

7. The apparatus of claim 6 wherein said plurality of devices are SCSI-type devices.

8. The apparatus of claim 1 wherein said priority modification means isolates said pseudo busy signal from a busy channel if said accessing is to be prevented.

9. In a system having a plurality of devices connected to a bus that carries a busy signal to a busy terminal of each of said devices when said bus is being used, a method of modifying a prioritization protocol used by said devices to determine which of said devices is granted access to said bus when more than one of said devices requests simultaneous access to said bus, said method comprising the steps of:

selecting, through the assertion of selection signals, at least one of the plurality of devices to be prevented from requesting access to said bus in accordance with a desired priority of bus access; and asserting a pseudo busy signal at said busy terminal of said at least one selected device so that said at least one selected device does not request access to said bus thereby modifying said prioritization protocol.

10. In a system having a plurality of devices connected to a bus that carries a busy signal to a busy terminal of each of said devices when said bus is being used and that implements a prioritization protocol to determine which of said devices is granted access to said bus when more than one of said devices requests concurrent access to said bus, a method of controlling access to said bus of selected ones of said plurality of devices, said method comprising the steps of:

selecting, through the assertion of selection signals, at least one of said devices to be prevented from accessing said bus in accordance with a desired priority of bus access; and asserting at said busy terminal of only said selected devices a pseudo busy signal to prevent each of said selected devices from accessing said bus.

11. The method of claim 10 wherein:

said prioritization protocol implements a SCSI-type protocol; and said asserting step further includes the step of:

isolating said pseudo busy signal from any nonselected devices.

12. The method of claim 10 wherein said provision of said plurality of devices further includes a second plurality of devices intercoupled via a second bus, each of said second plurality of devices implementing a second prioritization protocol for controlling access of said devices to said second bus.

13. The method of claim 12 wherein only devices coupled to a particular bus are prevented from accessing said bus.

14. The method of claim 12 wherein said plurality of devices are provided in a logical matrix of rows and columns, with devices of a particular column all coupled via a common bus.

15. The method of claim 14 wherein said selecting step nonselects no more than one device from each column.

16. The controlling method of claim 15 wherein all nonselected devices are within a common row.

17. The controlling method of claim 10 wherein said prioritization protocol promotes an imbalance of access times for devices intercoupled on a particular bus, said selection step further including a step of:

selecting said devices to reduce said imbalance.

18. The controlling method of claim 10 wherein a forecasted imbalance of access times for devices intercoupled on a particular bus is present, said selection step further including a step of:

selecting said devices through the assertion of said selection signals to reduce said imbalance.

19. An apparatus for controlling access to a bus, said apparatus comprising:

a first device, coupled to the bus, having a first priority level;

a second device, coupled to the bus, having a second priority level, which is higher than said fist priority level;

a first control circuit, coupled to said first device, for controlling attempts by said first device to gain access to the bus, said first control circuit adhering to a prioritization protocol that grants access to the bus to a device having a highest priority level when multiple devices simultaneously request access to the bus;

a second control circuit, coupled to said second device, for controlling attempts by said second device to gain access to the bus, said second control circuit adhering to said prioritization protocol; and a reselection control circuit, coupled to said first and second control circuits, for asserting a select signal, in accordance with a desired priority of bus access, to said first and second control circuits causing said first device to gain access to the bus when said first and second device both require access to the bus.

20. The apparatus of claim 19 further comprising:

a first logic circuit, coupled to said reselection circuit and said first control circuit; and a second logic circuit, coupled to said reselection circuit and said second control circuit, said second logic circuit providing a pseudo busy signal to said second control circuit in response to said select signal so that said second device does not request access to the bus.

21. An apparatus comprising:

a bus;

a plurality of devices, coupled to said bus;

a plurality of control circuits, corresponding to said plurality of devices, each control circuit being coupled to one of said devices, said plurality of control circuits implementing a prioritization protocol to determine which device accesses said bus at a given time; and a reselection control circuit, coupled to said plurality of control circuits, for modifying said prioritization protocol in accordance with a desired priority of bus access by preventing at least one of said plurality of devices from accessing said bus through the assertion of a select signal to said plurality of control circuits.

22. The apparatus of claim 21 further comprising:

a second bus; and a second plurality of devices coupled to said second bus, each implementing a second prioritization protocol in accessing said second bus; and wherein said modifying means is coupled to said second plurality of devices for preventing access of selected devices in said second plurality of devices to said second bus by asserting a pseudo busy signal to each of said selected devices in said second plurality of devices.

23. The method of claim 9 wherein said at least one selected device is a properly functioning device.

* * * * *